April 9, 1968   J. W. SLEMMONS   3,376,827
BRAKING SYSTEM FOR MINIATURE VEHICLES
Filed Jan. 27, 1966   7 Sheets-Sheet 1

INVENTOR.
JOHN W. SLEMMONS
BY Robert G. Rogers
ATTORNEY

April 9, 1968 J. W. SLEMMONS 3,376,827
BRAKING SYSTEM FOR MINIATURE VEHICLES
Filed Jan. 27, 1966 7 Sheets-Sheet 2

INVENTOR.
JOHN W. SLEMMONS
BY Robert G. Rogers
ATTORNEY

FIG. 3

INVENTOR.
JOHN W. SLEMMONS
ATTORNEY

FIG. 4

INVENTOR.
JOHN W. SLEMMONS
ATTORNEY

FIG. 5

INVENTOR.
JOHN W. SLEMMONS
BY Robert D Rogers
ATTORNEY

April 9, 1968

J. W. SLEMMONS 3,376,827

BRAKING SYSTEM FOR MINIATURE VEHICLES

Filed Jan. 27, 1966

INVENTOR.
JOHN W. SLEMMONS

BY Robert G Rogers

ATTORNEY

April 9, 1968 J. W. SLEMMONS 3,376,827
BRAKING SYSTEM FOR MINIATURE VEHICLES
Filed Jan. 27, 1966 7 Sheets-Sheet 7

INVENTOR.
JOHN W. SLEMMONS
BY
ATTORNEY

United States Patent Office 3,376,827
Patented Apr. 9, 1968

3,376,827
BRAKING SYSTEM FOR MINIATURE VEHICLES
John W. Slemmons, 19142 Glen Albyn,
Orange, Calif. 92667
Filed Jan. 27, 1966, Ser. No. 523,344
13 Claims. (Cl. 104—60)

This invention relates to systems for retarding movement of miniature vehicles and more particularly to a mechanical braking system for reducing the velocity of miniature vehicles.

Although there are many vehicles which may be categorized as miniature, one of the most popular grouping of vehicles so considered are the various classes of "slot" racing cars. Slot cars are driven along special tracks by electrical motors which receive energy from conductors mounted along the track. Each car is equipped with contacts for sliding along the electrical conductors to receive the energy. The contacts are ordinarily connected to a guide arm, which is part of the car. The guide arm includes a member which inserts and slides inside a slot or channel around the track. The guide arm directs the car along a predetermined course.

By changing the quantity of energy to the motor a slot car can be made to increase or decrease its velocity.

When the velocity of the car reaches a certain magnitude it must be reduced in order to maintain control of the car during turns. Although reducing energy to the motor by means of a hand control device reduces the velocity, of the momentum of the car ordinarily prevents rapid reduction of speed. Often, as a result, the car does not slow down soon enough to prevent loss of control. An operator may be required to reduce energy to the vehicle at an earlier point in time and be forced to operate a relatively slower car.

Recently an electrical system has been developed to slow down the electrical motor of a car and thereby reduce speed. The system does have a braking effect but may place a strain on the motor which may have a tendency to reduce motor life.

Another system used for braking is the mechanical system described in Patent No. 3,202,109. Generally, one braking system taught in that patent comprises pivotally mounting the motor on the car frame to permit a vertical rocking movement relative to the rear axle. A brake band is disposed around and normally is in engagement with the outer surface of a drive gear. One end of the band is provided with a hole through which the drive shaft projects. The other end is looped around the gear and is fixed to a pair of cross arms supported by the drive shaft. As the velocity of the vehicle increases, the motor rises in a general vertical direction to loosen the engagement of the band with the drive gear to enable unrestricted movement of the vehicle. When the car velocity is reduced, the motor descends and causes band engagement and a resultant loss of velocity.

The present invention overcomes the problems described above and is distinguished from both the electrical controller and the mechanical band system described in the referenced patent.

Briefly, the invention described herein comprises braking systems for miniature vehicles, preferably racing cars, although the system may be adaptable to other vehicles, such as trains. The vehicle includes various components normally associated with miniature vehicles, such as an axle having wheels at the ends thereof and a drive means for driving the axle at an angular velocity or rotation. The braking system includes a member having a surface which is non-rotatable or fixable relative to the angular rotation of the axle and the drive means. In one embodiment it may be affixed to the frame or disposed in such a configuration to other parts of the vehicle that it becomes fixed when engaged. Other portions of the brake include means for contacting said fixed surface when actuated and thereby reducing the angular velocity of the axle. The contacted surface, by analogy, may be designated as a brake drum and the contacting member as a brake shoe.

The shoe portion is actuated when the angular rotation of the drive means is at an angular velocity less than the angular velocity of the axle. The angular velocity differential may result, for example, when the energy to the motor driving the drive means is reduced. The momentum of the vehicle causes the axle to continue to rotate at its velocity immediately prior to reduction of energy to the motor. As a result, its angular velocity of the axle is relatively higher than the angular velocity of the drive means.

The brake system also includes means for disengaging the actuated portion from the fixed surface during normal motor operation when the angular velocity of the drive means is at least equal to the angular velocity of the axle.

The system may be used as a braking system for either one of both axles of a racing car. For example, the member having a fixed surface may, in one embodiment, include a linking means to actuate a front axle braking system when the rear axle braking system is actuated. In one embodiment, when the fixed surface is engaged, the member would tend to have an angular velocity and therefore impart a relatively slight force to the link. The force may be used to actuate the front axle braking system.

Therefore, it is an object of this invention to provide an improved mechanical braking system for vehicles driven by miniature motors.

It is another object of this invention to provide a mechanical braking system which is actuated upon a reduction of energy to the vehicle.

It is still another object of this invention to provide a mechanical braking system actuated and deactuated by changes in the angular velocity of the drive means relative to the axle.

A still further object of this invention is to provide a braking system for front and/or rear axles of a vehicle driven by a miniaturized motor.

These and other objects of this invention will become more apparent in connection with the following figures of which.

Figure 1:
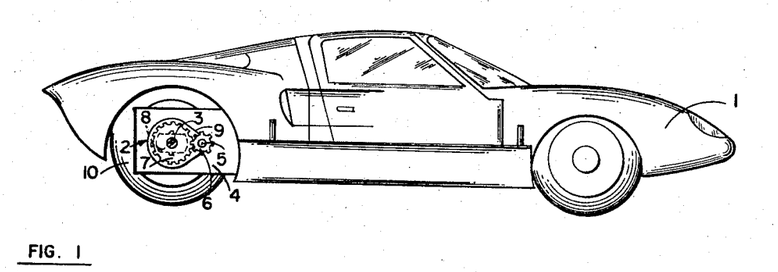
FIGURE 1 is a partial section of a miniature vehicle showing one embodiment of the braking system.

Referring now to FIGURE 1, wherein it is shown components forming a braking system for the rear axle of miniature car 1. In the view shown, the outer wheel has been removed so that braking system 2, in place on rear axle 3, can be easily viewed. Motor 4 is normally controlled by an operator (not shown) who either increases or decreases electrical energy to the motor to control its speed. In a "slot" car embodiment, the electrical energy is conducted via conductors along a slotted race way through brushes into the motor. The car is guided by an arm like member (not shown) which slides in the slot.

The particular configuration shown has a motor drive shaft 5 with pinion gear 6 parallel to the rear axis. The pinion gear is affixed to the shaft by set screw means 115. Motors driving an axle in that position are commonly called "side winder" motors. The invention is not intended to be limited to side winder applications since it may also be used in so-called "in line" motor applications. In line motors have a drive shaft including a pinion gear which is perpendicular to the rear axle (see FIGURE 9).

Other positions of the system shown are gear 7 mounted on axle 3 capable for rotation with respect to the axle and with the axle, first brake member 8 and second brake member 9. Remaining wheel 10 is also shown.

Figure 2:
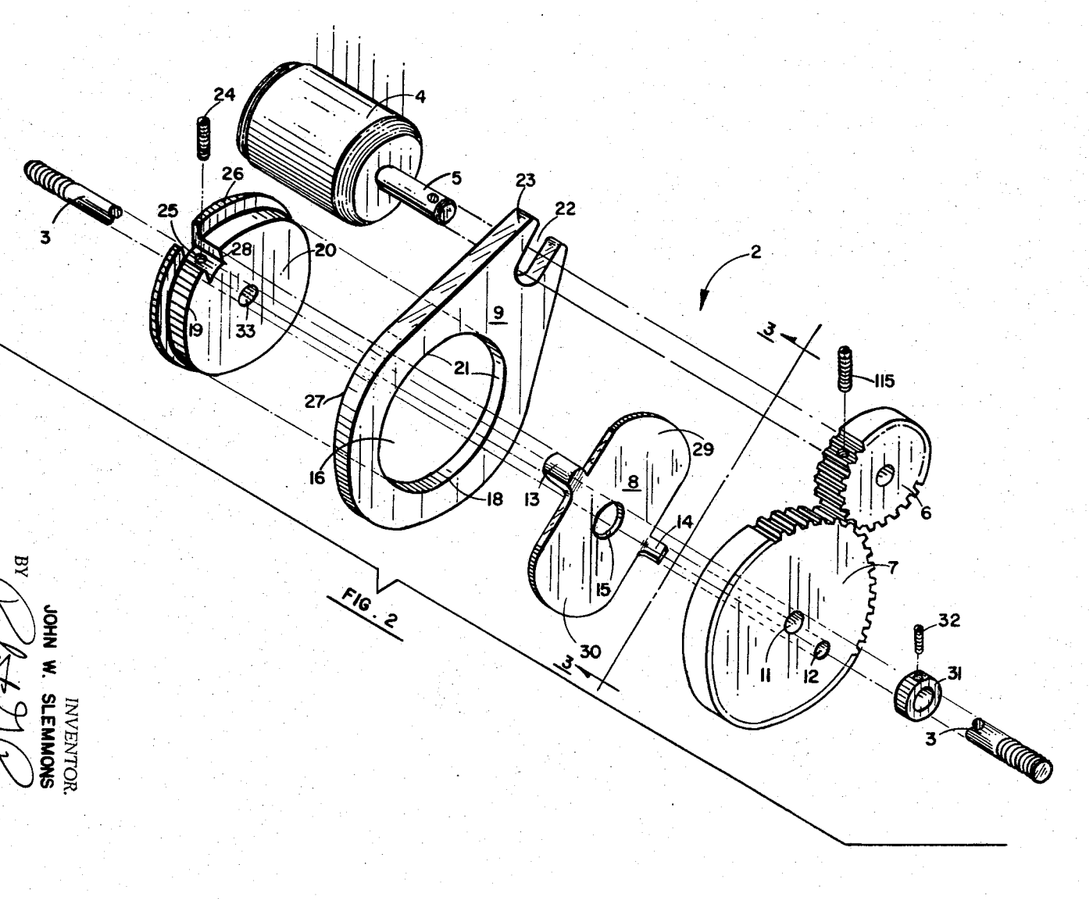
FIGURE 2 is an exploded view of one embodiment of the braking system.

Referring now to FIGURE 2 wherein is shown an exploded view of components forming braking system 2. Gear 7, often called a spur gear, is disposed around axle 3 by means of opening 11 through its center for angular rotation relative to the axle. In other words, the gear is not fixed on the axle. Gear 7 meshes with and is driven by pinion gear 6 which is affixed to shaft 5 of motor 4. Opening 12 near the outer circumference of gear 7 is normally smaller than opening 11.

Member 8, which may be described as brake lever means 8, has a first protruding portion 13 disposed orthogonally with respect to the width portion of member 8. The outer surface of portion 13 functions in part as a brake shoe member. The lever also includes second protruding portion 14 also orthogonal to the width of the lever in a direction opposite the first portion. The two protruding portions are located opposite each other along the center axis of the lever with one being at the top and the other at the bottom of the lever so that they are spaced a maximum distance apart. Portion 14 mates with opening 12.

In the center region of the lever, material has been removed to form opening 15. The opening may be described as having a configuration approximating two overlapping circles with substantially the same diameters. The opening may also be described as having the configuration of an oblong circle with its diameter in one direction greater than its diameter as a direction orthogonal to the first diameter. Opening 15 can accommodate axle 3 in at least two positions along its greater diameter. For convenience, it is assumed that the opening comprises an oblong circle having its center along a common diameter taken through the center of member 8 from side 29 to side 30. The circle has, in the embodiment shown, two center points, described by the angle θ (see FIGURE 3), which provides space in which axle 3 may shift. In other words, if member 8 rotates with the axle about the first center point a first angle or center of rotation is developed and if member 8 rotates with the axle about the second center point, a second angle of rotation develops.

When the member is not actuated to function as a brake the lever rotates with the axle about the first center of rotation.

When the lever rotates with the axle about the first center, the motor is driving the gear and the angular velocity of the gear and axle are approximately equal. The member may be said to be in a power position, meaning that the vehicle is being propelled or powered by the motor.

The brake is actuated when member 8 assumes a position about the second center of rotation. The member may be said to be in a brake position because the second center of rotation, in effect, causes protruding member 13 to engage surface 21 and reduce the angular velocity of axle 3.

The brake is also comprised of member 9 which may be designated as a brake drum member. In the embodiment shown, it has a disk like shape with a substantial part of the material removed to form opening 16 through its control area. It has an inner circumference 18 which fits loosely around the outer circumferential surface 19 of collar 20. The fit is normally loose as contrasted with a rigid fit otherwise the friction between member 9 and collar 20 could interfere with the velocity of the vehicle. The drum portion includes surface 21 which is rigidly maintained or which may be fixed relative to the angular rotation of the axle and gear 7 to serve as a fixed reference for reducing the angular velocity of the axle and therefore the velocity of the vehicle.

In the embodiment shown, the surface is fixed by providing an indentation or channel 22 at extremity 23 thereof. The indentation partially encloses shaft 5 so it does not have angular motion and so that surface 21 is substantially fixed relative to the axle and gear 7. The indentation loosely engages the shaft so that it does not interfere with shaft rotation.

It should be understood that the fixed surface may be connected or designed to mate with other portions of the vehicle including its frame so that it can be made rigid or fixed with respect to the axle and the gear.

Collar 20 is fixedly connected to axle 3 by means of set screw 24 in threaded opening 25. The collar includes an opening 33 through its center or enclosing axle 3. The collar also includes a raised flange or circular edge 26 about its circumference for loosely contacting side surface 27 of the drum to prevent the drum from having translatory motion towards wheel 10 (see FIGURE 1). The collar has groove or slot 28 provided in its outer circumference. Protruding portion 13 fits into or mates with the slot. In a preferred embodiment, portion 13 has a thickness approximating the depth of slot 28 and a curved outer surface which is less than the curvature of surface 21.

In an assembled portion, lever 8 connected to gear 7 by protruding portion 14 engaging opening 12 and to collar 20 by insertion of protruding portion 13 into slot 28. The drum rests on surface 19 of collar 20 and is maintained in that position by edge 26 on one side and on the other side by the extensions or outer edges 29 and 30 of lever 8. The distance between edges 29 and 30 is greater than the diameter of opening 16.

Connector 31, such as a simple collar, is fixed to axle 3 by set screw means 32 and cooperates with collar 30 to hold the assembly together and to prevent translation of the various parts along the axle.

Slot 28, protruding portion 13 and opening 15 are designed so that when the brake shoe is not actuated, the shoe rotates with the axle and does not contact surface 21.

The parts described above and in connection with other embodiments described herein may be produced by various materials and processes. For example, the collar may be brass, aluminum, steel, hard nylon and other materials suitable for the purpose intended and may be produced by machining, die casting or molding.

The drum member may be aluminum, brass, hard rubber or plastic material having an asbestos filler and other materials. It may be produced by punch press, die cast, molding and other means well known in the art.

Member 8 may be made of brass, steel or other materials and may be produced by stamping, die casting and other processes.

Gear 7, as well as the other gears shown, may be made of brass, steel, hard nylon and other materials and may be produced by sintering, machining, stamping, molding and other processes.

The examples given of materials and processes are not intended to be inclusive and are not intended to limit the various materials and processes which can be used to produce the parts. It is believed that many materials and combinations and processes well known in the art can be used in producing the braking system.

The particular material selected for the components as well as the process for producing the components depends in part on the forces and environments to which the part is subjected.

Figure 3:
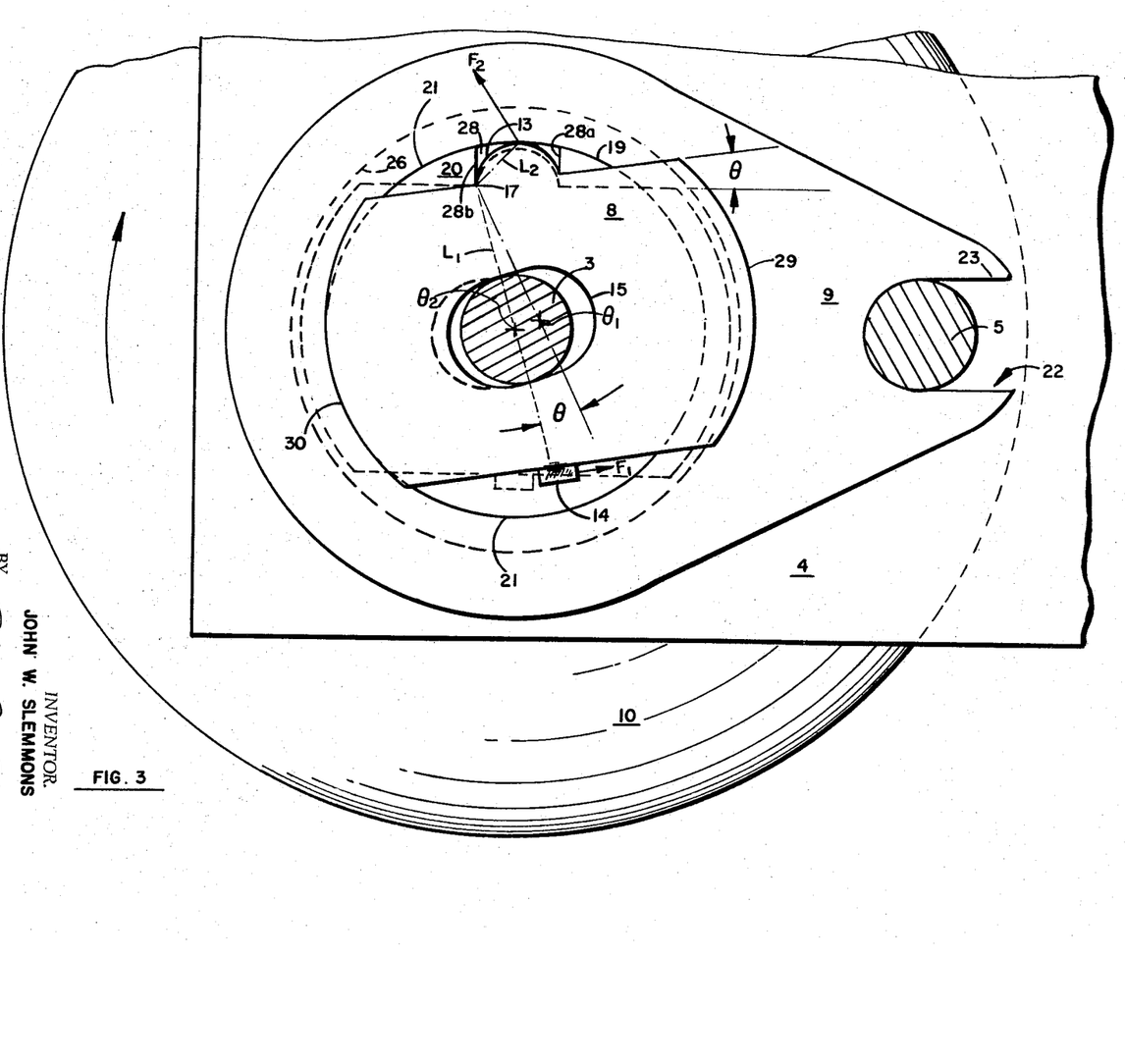
FIGURE 3 is a sectional side view of the FIGURE 1 embodiment taken along lines 3—3.

Referring now to FIGURE 3, wherein is shown a cross sectional view of the FIGURE 2 assembly taken along lines 3—3. Gear 7, which is not shown, is described in connection with FIGURE 2. FIGURE 3 with FIGURES 1 and 2, may be used to describe the operation of the brake system.

In operation, member 8 rotates with axle 3 because protruding member 14 engages opening 12 and protruding member 13 engages slot 28. The axle is in contact with the outer edge of opening 15 nearest edge 29. Normally, when the brake is not actuated member 8 rotates about a center of rotation $\theta_1$, and the outer surface of 13 does not engage the inner surface 21 of member 9. The motor provides a drive for gear 7 which exerts a clockwise force on portion 14 to impart clockwise motion to member 8. Member 13 exerts a force against side 28a and causes collar 20 to assume a clockwise rotation at an angular velocity equal to the angular velocity of gear 7.

When energy to the motor is reduced, instantaneously the angular velocity of gear 7 is reduced. However, due to the momentum of the vehicle, the axle continues to turn at its angular velocity immediately prior to the instant the energy was reduced.

As a result, gear 7 is rotating relatively slower than the collar. Gear 7 can be described as having a negative angular rotation with respect to the angular rotation of collar 20. Side 28b then exerts a resulting clockwise force on member 13 tending to push it in a clockwise direction and gear 7, in effect, exerts a counter clockwise force on member 14 tending to push it in a counter clockwise direction. As a result of the forces being applied in opposite directions, member 8 rotates or shifts from its original position by an angle $\theta$ so that its outer surface snaps into contact with or firmly engages surface 21 of member 9. Simultaneously, the bottom portion of surface 21 is behind pulled upward into contact with the bottom circumferential surface area of collar 20 depending on the rigidity of that member. The shifting is relatively fast and is a function of the difference between angular velocity of the axle and the angular velocity of gear 7 just after the energy is reduced. The member is permitted to shift because of the enlarged opening 15. It moves with respect to the axle so that it assumes a second center of rotation $\theta_2$. When the outer surface 13 engages fixed surface 21 it quickly reduces the angular velocity of collar 20 and axle 3 until the angular velocity of gear 7 and that of the collar are approximately equal and the opposing forces are removed.

As indicated above, when the brake is actuated, member 8 assumes a center of rotation $\theta_2$. The distance between the center of rotation $\theta_1$ and $\theta_2$ must not be less than the distance between the outer surface of member 13 and fixed surface 21 taking into consideration any upward movement of drum 9 so that surface 21 contacts surface 19 at the bottom portion thereof. In other words, opening 15 must have a diameter sufficient to enable member 8 to shift or rotate by an angle $\theta$ so that surface 13 engages surface 21. In order to compensate for wear of the shoe and drum, the opening may be made slightly larger than necessary.

It is believed that the brake operates as described above. However, actuation of the brake shoe so that it contacts the brake drum may be described differently. In other words, whenever the energy to the motor is reduced, instantaneously, the gear 7 appears to have a negative angular velocity relative to the axle since the axle is, during that instant, rotating faster than the rotation of gear 7. The negative velocity causes the center of rotation of member 8 to be shifted from $\theta_1$ to $\theta_2$ to cause the outer surface of the shoe to engage or contact the fixed surface of the drum.

It is believed that the outer surface of the shoe engages surface 21 with a force which is a function of the distance from point 17 to the protruding member 14 and point 17 to the contact point of shoe 13 and the force placed on member 14 as a result of the instantaneous negative velocity of gear 7. It may generally be described as mechanical lever action. For example, assume the force on 14 is $F_1$ and the distance from 14 to 17 is $L_1$. Further assume the distance $L_2$ from 17 to the point of contact is $L_1/10$. In that case, the force engaging the shoe and drum, $F_2$, is approximately ten times greater than the force applied to 14. The lever action thus achieves a mechanical advantage and causes the vehicle to decelerate faster than would be possible without the lever action. The formula might be set forth as:

$$F_1L_1=F_2L_2$$

Figure 4:
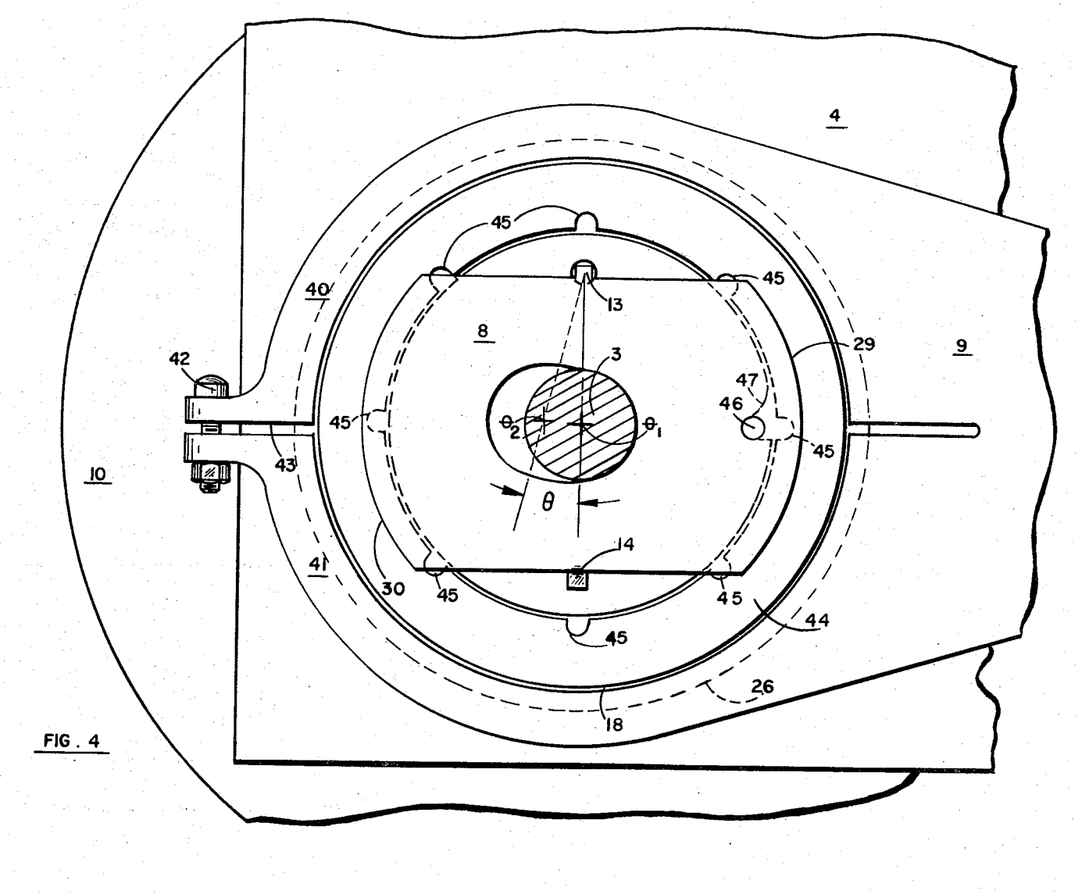
FIGURE 4 is a sectional side view of a second embodiment of the braking system.

Referring now to FIGURE 4 wherein is shown a second embodiment of the braking system also taken along lines 3—3 of the FIGURE 2 configuration. Member 8 for the embodiment shown includes oppositely protruding portions 13 and 14 and an additional protruding portion 46 which extends in the same general direction as protruding portion 13 and engages collar 20 in an indentation 47. Member 9 is divided into an outer portion and an inner portion. The outer portion is comprised of upper parts 40 and lower part 41. Parts 40 and 41 are joined at one termination thereof by means of connector 42 which is shown as a nut and bolt. As space 43 is reduced by tightening the nut and bolt, the force applied to the inner portion 44 is made greater so that the inner portion 44 becomes more difficult to rotate. It may be necessary in a particular embodiment to include a connector such as a screw and washer combination to secure 44 inside the outer portion.

Under normal conditions, the edges 29 and 30 of member 8 rotate in loose contact with the side of the inner portion 44 and hold member 9 into contact with the outer edge 26 of collar 20 as shown in FIGURE 2. In normal operation, with the power to the axle applied by the motor, member 8 rotates with axle 3 about center $\theta_1$. When the energy to the motor is reduced, the center of rotation shifts to $\theta_2$ and the protruding member 46 engages one of the grooves 45 found in the inner circumference of member 44 to reduce the angular rotation of the axle until it equals the angular rotation of gear 7. When energy is again applied to the motor, the center of rotation is shifted back to $\theta_1$ out of brake position allowing free rotation with respect to member 44.

Figure 5:
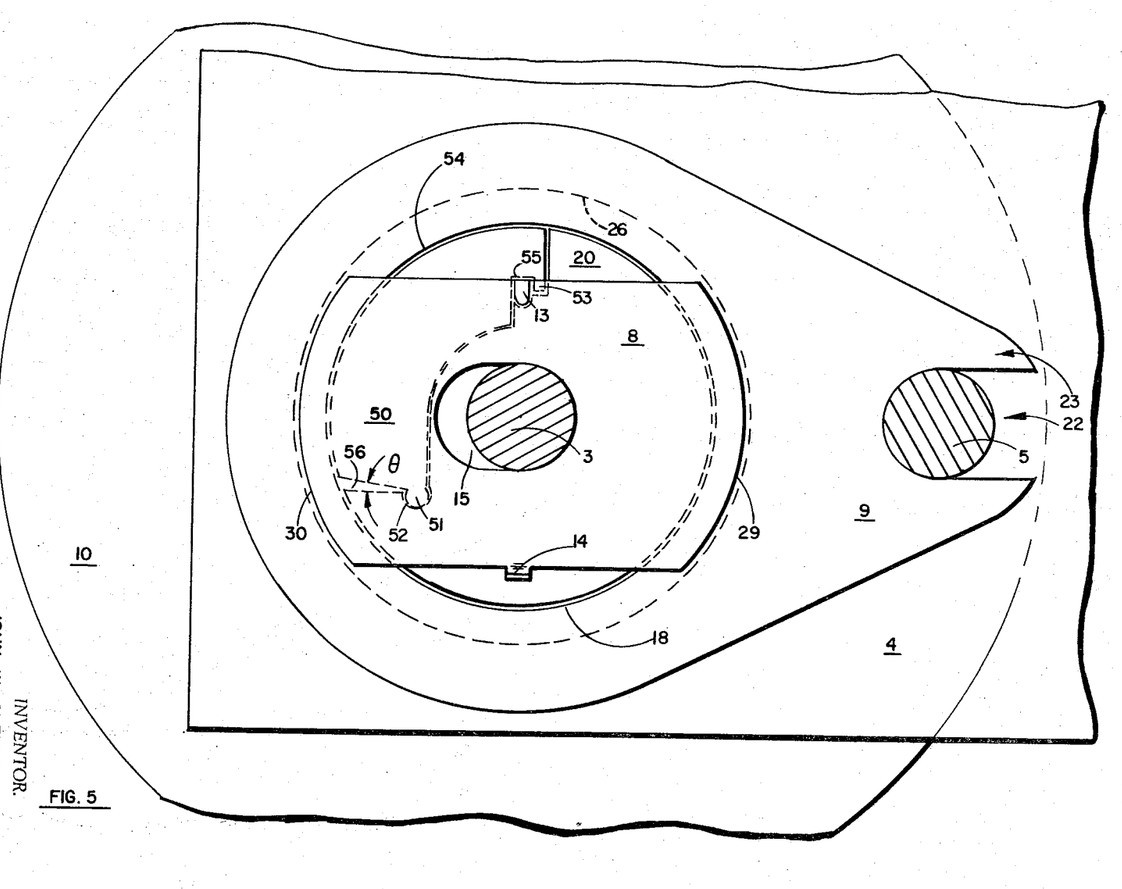
FIGURE 5 is a sectional side view of a third embodiment of the braking system.

Referring now to FIGURE 5, a third embodiment of the braking system is shown also taken along lines 3—3 of FIGURE 2. In the FIGURE 5 embodiment, an additional member is connected to lever 8. Collar 20 is also modified so that instead of slot 28, a substantial portion of the outer circumference area 19 about one side is removed. For the embodiment shown, an area covering approximately 100° has been removed. The thickness of the layer removed may vary but in a preferred embodiment the thickness would be no greater than the thickness of member 9 and no greater than the width of the outer circumference 19. Member 50 which is added to lever 8 includes a slotted area 55 which engages portion 13. At the other extremity of member 50 is a circular or ball-like member 51 which engages socket member 52 to form a hinge with respect to collar 20. The hinged connection enables member 50 to pivot outwardly and engage surface 54 when it is actuated. When actuated, the spacing 56, or $\theta$, between member 50 and collar 20 is reduced. The distance between surface 54 and the outer surface of pivoting member 50 can be no greater than distance 56 or member 50 functioning as a brake shoe will not engage surface 54 which functions as a brake drum. Member 8 is actuated as described in connection with the previous embodiment.

Figure 6:
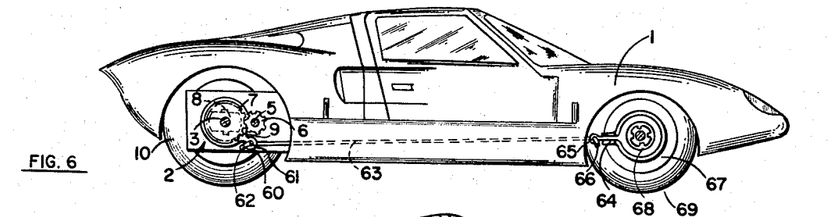
FIGURE 6 is a partial section of a miniature vehicle showing one embodiment of the braking system for the front axle.

Referring now to FIGURE 6, wherein is shown vehicle 1 having rear wheel brake system 2 and front wheel brake system 67 including link 63 connecting the two brake systems. Also shown is the extended portion 60 or member 9 having opening 61 therein for mating with the bent termination 62 of link 63.

Figure 7:
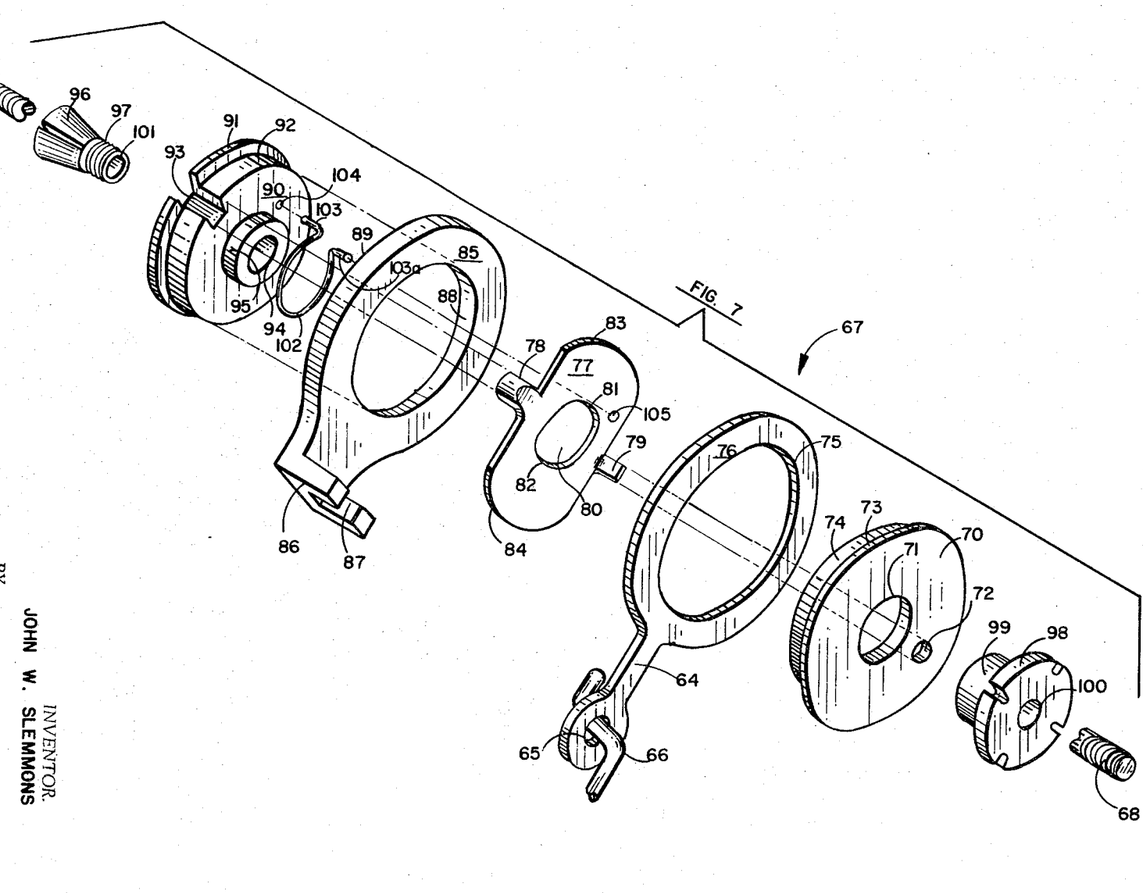
FIGURE 7 is an exploded view of the braking system for the front axle.

Referring now to FIGURE 7, wherein is shown the front wheel braking system in exploded view. The front wheel brake system includes substantially the same components as does the rear wheel brake system except that certain components are modified so that they functionally achieve the same result as the components for the rear wheel brakes. Actuating gear 70 operates functionally similar to gear 7. It includes an opening 71 into which axle 68 fits and relatively smaller opening 72 into which protruding portion 79 of member 77 inserts. It also includes a raised outer edge 73 for holding control washer 76 in place with respect to inner circumference 74 of gear 70. Control washer 76 includes inner diameter 75 for mating with circumference 74. The mating is loose as contrasted with a fixed or rigid mating. Control washer 74 also includes an arm or extended portion 64 having an opening portion 65 therein for engaging the bent termination 66 of linking means 63. Link 63 may be a rigid material, such as steel, wire or other material having ends which may be bent for engaging opening 65 in the front wheel brakes and opening 61 of extended arm 60 of the member 9 of the rear wheel brakes (see FIGURE 7).

Front wheel brake lever 77 comprises protruding members 78, θ functions as a brake shoe and 79 and outer edges 83 and 84. Opening 80 comprises an oblong circle having outer edges 81 and 82. The brake drum or disc member 85 includes an inner surface 80 and a protruding section 86 at one end thereof having slot 87 therein for mating with the neck portion of arm 64 of washer 76. The function of collar 20 is substantially duplicated by collar or drive bushing 90. The collar includes slot 93, raised outer edge 91 and outer circumference 92.

For the embodiment shown, instead of using a set screw and a collar to hold the parts together, a collet 96 and lock bushing 98 are used. As a consequence the center openings for the various components are larger than if other connection means are used to hold the part together. Collet 96 includes threaded member 97 and opening 101 through which axle 68 fits. Lock bushing 98 is threaded to mate with the threaded portion of collet 96 and includes opening 100 through which axle 68 is inserted. In addition, lock bushing 98 has an inner circumference portion 99 which extends orthogonally from or at a right angle to its raised edge 98 and which has a length for extending through openings 71, 80, etc., to abut the protruding portion 95 of collar 90. When the collet engages the bushing, the slotted portion at the end of the collet presses into contact with the axle and secures the collar 90 to the axle. The collet is depressable because of the slots. The slots must have a spacing sufficient to permit contraction of the collet into contact with the axle. When assembled, raised edge 98 loosely contacts member 70 and presses the other portions of the system together so that the inner circumference of member 85 loosely contacts the raised edge 91 of member 90. Extended portion 95 is important so that during assembly, extended portion 99 does not rigidly press member 77 against the inside surface of member 90 and prevent operation of the front wheel brake. Spring 102 including terminal 103 for engaging opening 104 in collar 90 and terminal 103a for engaging opening 105 in lever 77 prevents the brake shoe from engaging the brake drum before actuation. When actuated, the spring force is overcome and the shoe and drum engage.

In operation, the negative velocity described herein is created when the energy to the motor is reduced and the rear wheel brakes are engaged. The member 9 which is connected to link 63 prevents the brake from binding undergoes a slight arc to exert a force on the link. The force exerted causes 76 to contact 79.

Whenever surface 75 or 76 contacts the outer circumference area 74 of member 70 to impart a negative velocity to member 70, shoe 78 is actuated and pressed into contact with surface 80 of drum 85. Surface 80 of drum 85 is rigidly maintained by means of the extended member 86 which engages the mechanical portion of 64. During normal operation portion 99 rotates in contact with surface 81 of lever 77. The other edge of oblong opening 80 is shown as edge 82.

It should be understood that even though a collet and lock bushing are shown for holding the assembled components on the front axle in a preferred embodiment, other means of connection may also be used for both the front and rear assemblies. The particular connections are shown by way of example only. It should also be understood that the materials and processes described in connection with FIGURE 1 are also intended to apply to the other embodiments as well.

Figure 8:
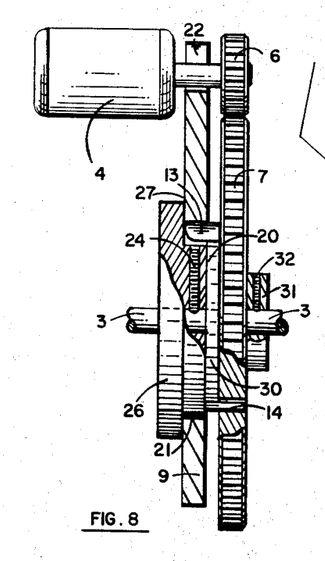
FIGURE 8 is a top view, partially sectional, showing an embodiment of the braking system.

Referring now to FIGURE 8, wherein is shown a top view of an assembled braking system. The view shows the brake system as actuated. Protrusion 13 is shown engaging surface 21 of member 9. Set screws 24 and 31 are clearly shown for contacting outer edge of axle 3. Flange 26 is shown contacting surface 27 of member 9. Connector 31 is shown pressing the components together on axle 3 with portion 14 connected to gear 7. Gear 7 is being driven by motor 4 through gear 6.

Referring now to FIGURE 8, wherein is shown a rear view, partially sectional, of the FIGURE 2 embodiment. The braking system is shown with shoe 13 engaging surface 21. The bottom portion of surface 21 is also shown engaging the circumferential area of collar 20. Other portions of the system shown include axle 3 and set screw 24 holding collar 20 rigidly in place on the axle. Set screw 32 is shown holding connector 31 rigidly in place on the axle. The connector and the collar provide support on both sides of the system for keeping it meshed or fitted together during operation.

Also illustrated more clearly in the figure is the contact area between flanged portion 26 of collar 20 and side 27 of drum 9. Lever 8 is shown engaged to gear 7 by protruding 14 and to collar 20 by protruding 13.

Figure 9:
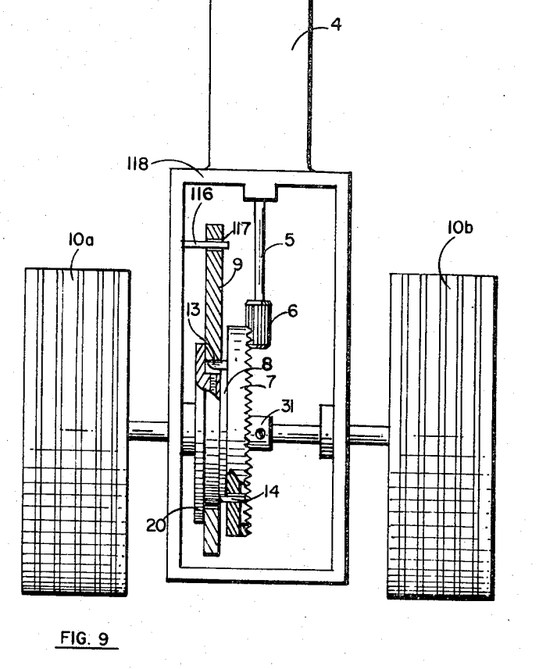
FIGURE 9 is a top view of a partially sectional view of the braking system used with an "in line" motor.

Referring now to FIGURE 9, wherein is shown the braking system in operation with an "in line" motor. The system shown is substantially the same in component parts and functions as the FIGURE 2 embodiment. The exception being gear 7 which is shown as a crown gear for meshing with pinion gear 6. The side winder application was shown with a spur gear. Other changes include connecting of drum 9 to pin 116 through opening 117 instead of being fixed by a connection to the axle 5 as previously illustrated. The drum could also have been extended, made flat and placed into abutment with frame portion 118. Other means for making the surface fixed with respect to angular rotation of gear 7 and axle 3 may also be used. Although portion 4 of the system includes collar 20, protruding 14 mating with gear 7 and protruding 13 which mates with collar 20, brake lever 8 and connector 31. Wheels 10a and 10b are also shown.

Figure 10:
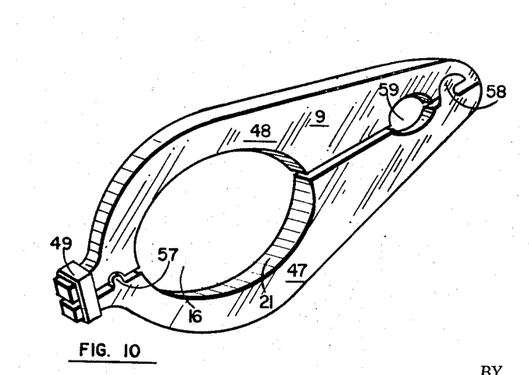
FIGURE 10 is a side view of a second embodiment of an easily replaceable fixed braking member.

FIGURE 10 illustrates a different embodiment for drum 9. The utility of the part in the system can best be understood when described in connection with FIGURE 9. Over a period of time, engagement of protruding portion 13 with surface 21 of drum 9 may cause wear of surface 21 or of the protruding portion. However, if the surface 21 is made of a softer material than portion 13, it will wear before portion 13. If the wearing of surface 21 is substantial, axle 3 will contact the opposite edge of opening 15 when the brake is actuated and the outer surface of 31 will not engage surface 21. In that event, no braking action will result and the drum must be replaced. It may also be possible to enlarge opening 15.

Preferably, drum 9 should be replaceable without having to disengage the entire assembly. The FIGURE 10 drum embodiment provides for easily replacing the worn drum without disturbing the assembly. It is comprised of upper portion 48, lower portion 47 and clamp 49, such as a rectangularly metal clamp for insertion over the protruding ends of the upper and lower portions. The drum also includes opening 59 for a pin or axle and hook 58 for connecting the upper and lower portion at the extremities of the drum opposite the metal clamped extremities.

Stub 57 is included near the clamped end so that a pivot is provided for firmly engaging hook 58 of part 47 with part 48 when the clamp is inserted over the protrusions. Opening 16 and surface 21 are substantially shown as in the FIGURE 2 embodiment. When surface 21 is sufficiently worn, clamp 49 may be removed and the two halves are lifted apart and removed from the brake assembly. A new drum can then be easily re-inserted into an operable position.

Figure 11:
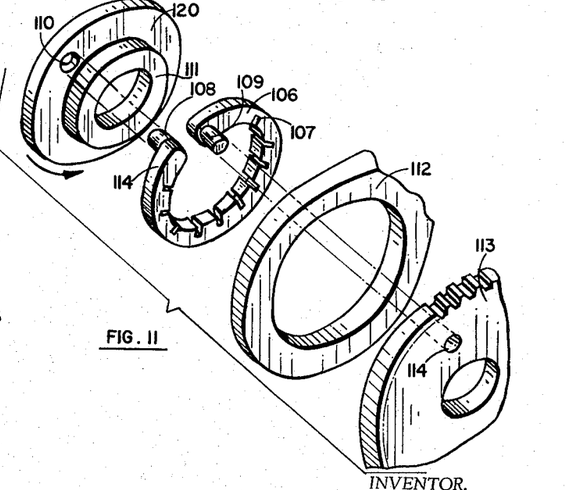
FIGURE 11 is an exploded view of a fourth embodiment of the braking system.

Referring now to FIGURE 11, wherein is shown a braking embodiment which uses a different brake lever or shoe. Other parts of the system included are substantially the same, for example, gear 113, drum 112 and collar 120 provide the same function as in the FIGURE 2 embodiment.

Brake lever band 106 is shown as an expandable band having protrusion 108 for inserting into opening 110 of collar 120 and protrusion 109 for inserting into opening 111 of gear 113. Channels or grooves 107 are provided along the inner circumference of the band to permit it to be compressed and expanded.

The band, when the brake is actuated, expands and surface 114 contacts the inside surface of drum 112.

Although not shown, the collet and lock nut arrangement of FIGURE 7 could be used to affix the assembly to the axle (not shown). A set screw or other means could also be used to affix the assembly operable to the axle.

In operation and assuming counter clockwise rotation of gear 113, collar 120 is caused to rotate because the band contacts or compresses and the edge nearest protrusion 109 contacts the edge nearest protrusion 108 and exerts a force thereon for causing collar 20 to rotate. Since the band is compressed, the outer surface rotates free of the inside surface of member 112. When the energy to the motor (not shown) is reduced and gear 113 instantaneously has a negative velocity with respect to collar 120 (previously described), the band expands and surface 114 engages the inner surface of 112 thereby causing the angular velocity of the axle to be reduced until it is approximately equal to the angular velocity of gear 113. Sufficient slots must be provided so that when compressed, band 106 does not engage drum 112.

While the principles of the invention have now been made clear in an illustrative embodiment there will be immediately obvious to those skilled in the art many modifications in structure, arrangement, the elements and components used in the practice of the invention, and otherwise, which are particularly adapted for specific environments and operating requirements without departing from those principles. The appended claims are therefore intended to cover and embrace any such modifications within the limits only of the true spirit and scope of the invention.

What is claimed is:

1. A braking system for a miniature vehicle comprising an axle having wheels at the ends thereof,
   gear means disposed around said axle for angular rotation with respect thereto,
   drive means for driving said gear means,
   collar means fixedly disposed around said axle for angular rotation therewith, and
   brake means comprising a first member having a surface fixable relative to the angular rotation of said axle and said gear means, a second member joined to said gear means and collar means for driving said collar means in response to angular rotation of said gear means and for engaging the fixable surface when actuated for reducing angular rotation of said axle means, said means being actuated when the angular velocity of said axle is greater than the angular velocity of said gear means.

2. The combination as recited in claim 1 wherein said second member includes means causing angular rotation about a first center of rotation when driving said collar means and means causing angular rotation about a second center of rotation for engaging said fixed surface.

3. The combination as recited in claim 1 wherein said second member includes means causing angular rotation about a first center of rotation when driving said collar means and means causing angular rotation about a second center of rotation for engaging said fixed surface and wherein said first member includes a second fixable surface for engaging a surface of said collar means when said second member is actuated.

4. The combination as recited in claim 1 wherein said second member includes means causing said second member to shift to a second center of rotation for engaging said fixable surface, said second member further including means for disengaging said second member from said fixable member when the angular velocity of the gear means is at least equal to the angular velocity of the axle.

5. The combination as recited in claim 1 wherein said second member includes means causing angular rotation about a first center of rotation when driving said collar means and means causing said second member to shift to a second center of rotation for engaging said fixable surface and said collar means includes a slot in the outer circumference thereof, said second member includes a first protruding member for mating with said slot for driving said collar means said protruding member having an outer surface for engaging the fixable surface when actuated, said second member further including a second protruding member for connecting to said gear means, said first and second protruding members being at opposite locations on said second means.

6. The combination as recited in claim 1 wherein said first member comprises an outer member and an inner member rotatable with respect to said outer member, said outer member being adjustable to retard the rotation of said inner member, said inner member having an inner circumference with a plurality of slots provided therein, said second member having at least one protruding portion for mating with at least one of said grooves when said second member is actuated.

7. The combination as recited in claim 1 wherein said second member comprises at least one pivoting member mounted on said collar for pivoting with respect to said collar means into contact with said fixable surface when said second member is actuated.

8. The combination as recited in claim 1 wherein said second member comprises expandable band means having a first protruding portion joined to said gear means and a second protruding portion joined to said collar means.

9. The combination as recited in claim 1 wherein said axle is the rear axle and wherein is added a front axle having wheels at the ends thereof and a braking system comprising means having a surface fixable relative to the angular rotation of the front axle and means normally rotating with said axle for engaging said fixable surface upon actuation for reducing the angular velocity of the axle, means interconnecting the braking system for the rear axle with the braking system for the front axle, said means being actuated by the actuation of said second member.

10. The combination as recited in claim 1 wherein said axle is a rear axle and wherein is added a front axle having wheels at the ends thereof, front axle brake system comprising,
  a second collar means fixedly mounted on said axle for angular rotation therewith,
  a second rotating member mounted on said axle for angular rotation with respect thereto,
  second means interconnecting said second collar and said second rotating member,
  means having a surface fixably mounted with respect to the angular rotation of said second collar and said second rotating member,
  control means having a configuration for normally loosely engaging said second rotating member,
  linking means joining said first member of the rear axle brake means to said control means including means exerting a force on said control member when said first member is engaged by the second member of the rear axle brake means for reducing the angular velocity of said second rotating member with respect to the angular velocity of said second collar,
  said second interconnecting means including means actuated by the reduction in the angular velocity of said second rotating member with respect to said second collar and having a surface for engaging said fixable surface when actuated for reducing the angular velocity of said second collar means, and
  spring means connected to said second interconnecting means and said second collar means for maintaining spacing between said surface for engaging and said fixable surface except when said interconnecting means is actuated.

11. The combination as recited in claim 1 wherein said first member comprises a replaceable member having an upper portion and a lower portion including clamp means for holding the portion in place.

12. A braking system for a miniature vehicle having an operator controlled miniature motor including drive means for driving an axle having wheels at the ends thereof at an angular velocity, said braking system comprising means having a surface fixable relative to the axle and engaging means connected to said drive means and normally rotating with said axle, and rotatable with respect to said axle for engaging said fixable surface upon actuation by said drive means for reducing the angular velocity of the axle, said means being actuated by reducing the energy to said motor.

13. In a miniature racing car means comprising,
  first drive gear mounted to said axle for rotating with respect thereto,
  motor drive means for driving said first gear,
  second drive gear connected to said axle and responsive to rotation of said first gear for causing rotation of the axle,
  interconnecting means normally rotating at a first center of rotation including means for connecting said first and second gears and having means for rotating about a second center of rotation when the angular velocity of said axle is greater than the angular velocity of said first drive gear means, said means having a protruding member, and
  means fixedly maintained relative to said drive gear and said axle for contacting said protruding member when said interconnecting means is rotated about said second center of rotation for reducing the angular velocity of said axle.

References Cited
UNITED STATES PATENTS 3,202,109   8/1965   Stewart _________ 46—243 X LOUIS G. MANCENE, *Primary Examiner.*

R. F. CUTTING, *Assistant Examiner.*